(No Model.)
J. A. JOHNSTON.
VEHICLE WHEEL.
No. 349,435. Patented Sept. 21, 1886.
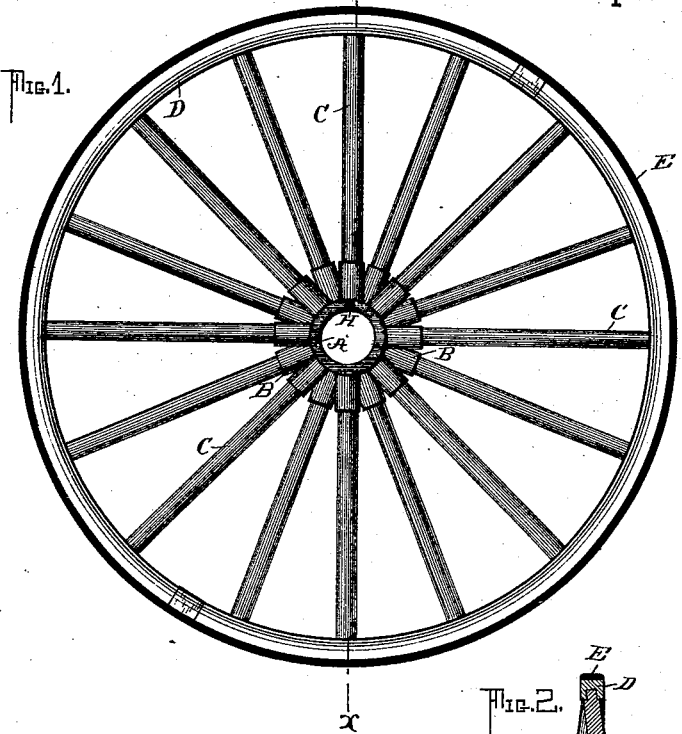
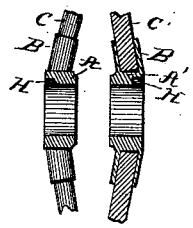
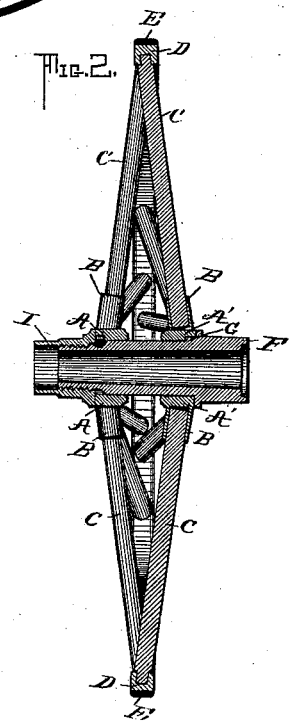
WITNESSES
W. M. Rheem.
INVENTOR
James A. Johnston
By　　　　　　Attorney

UNITED STATES PATENT OFFICE.

JAMES A. JOHNSTON, OF TOPEKA, KANSAS.

VEHICLE-WHEEL.

SPECIFICATION forming part of Letters Patent No. 349,435, dated September 21, 1886.

Application filed August 3, 1885. Renewed August 28, 1886. Serial No. 213,096. (No model.)

*To all whom it may concern:*

Be it known that I, JAMES A. JOHNSTON, a citizen of the United States, residing at Topeka, Kansas, have invented new and useful Improvements in Vehicle-Wheels, of which the following is a specification.

My invention relates to certain improvements in wheels for vehicles.

It has for its objects simplicity and economy in construction and great strength and durability in use. It also has for its object to provide, by its peculiarity of construction, a ready means for expanding the wheel to make a close juncture with the tire and avoid the possibility of loose spokes.

With these ends in view my invention consists in forming the wheel with two malleable iron hubs, which I designate as "ring" hubs, provided with any desired number of radial spoke-sockets, the latter arranged at a slight or suitable angle to the axis of the hub, in order that the proper "dish" may be given when the rim of the wheel is applied, and adapting said hubs for the reception of the box, which shall also confine the same in any proper fixed or adjustable position.

My invention also consists in the minor details of construction which I have devised to carry out the generic or broad feature of my invention, and as will be hereinafter more fully described and specifically claimed.

In order that those skilled in the art to which my invention appertains may fully understand the same I will proceed to describe the construction and operation of the same, referring by letters to the accompanying drawings, in which—

Figure 1 is a side elevation of an ordinary carriage-wheel embodying my invention. Fig. 2 is a vertical cross-section of the same, taken at the line *x x* of Fig. 1. Fig. 3 is a side view of the box and securing-nut, and Fig. 4 a detail section, similar to Fig. 2, on an enlarged scale and with the box removed.

Similar letters of reference indicate like parts in the several figures.

A and A' represent cast-metal ring-hubs, made preferably of malleable iron, provided with any desired number of spoke-sockets, B, adapted to receive the ends of the spokes C. The sockets B are arranged at a suitable angle to the body of the hub, as clearly shown at Fig. 2, so that the proper dish may be given to the spokes; and when the ring-hubs are properly combined with the spokes and box they are so arranged axially on the box and with reference to the rim that the spokes connected with the ring-hub A will properly alternate with those connected with the ring-hub A'. The outer ends of the spokes C are tenoned into the rim D in the usual manner, and the tire E surrounds the whole.

F is the box, which may be made of any suitable material by any desired process. The inner end is formed with a flange, F', (see Fig. 4,) adapted to bear against the ring-hub A', and with a feather, G, to fit within a feather-groove, H, in the ring-hub to secure a fixed axial relation between the box and the hubs. The outer end of the box is provided with a suitable thread to receive the confining-nut I, by the use of which the ring-hubs A and A' are drawn toward each other to give the proper dish to the spokes and at the same time to tighten and render secure the wheel at all points. Each of the ring-hubs is formed with the feather-groove H, in order that the box F may be put in place from either side of the wheel.

It will be observed that the relation or degree of separation between the hubs A A' is such that should the rim become loose from any cause within the tire, it may be expanded and the wheel thus made tight by simply turning the confining-nut I a little farther on the thread of the outer end of the box F, thus drawing the ring-hubs closer together and shortening the line from the rim to the hub, and consequently causing the spokes to press against the rim in an obvious manner.

Of course many changes may be made in the details of construction without departing from the spirit of my invention, the generic or broad feature of which rests in the idea of employing two ring-hubs capable of receiving a central box, and of being drawn toward each other when the spokes and rim have been put in position to complete the wheel.

I am of course aware that it is not new to form a wheel with two hubs capable of being drawn together for the purposes just described, for that idea is shown in Letters Patent No. 127,063, granted to me May 21, 1872; but in that case the two ring-hubs were not capable of receiving a central box, but, on the contrary, one of said hubs was formed with the box integral therewith, and the projecting portion of said box adapted to enter the other ring-hub, which latter was the only one capable of movement on the box or toward the vertical center of the wheel.

My present invention, while very generic, is, as will be observed, very simple in construction and very strong and durable when in use.

A wheel embodying my invention is capable of being readily put together and taken apart, and it will be seen that the box when worn, or any other defective portion of the wheel, may be removed and replaced by a new one, which, in wheels of the same size, would of course be interchangeable.

I am aware that it is not new, broadly, to provide the hubs of vehicles with a feather-groove for the reception of a corresponding feather or spline formed on the exterior of the axle-box on which such hub is placed; but in former instances, so far as I am aware, it has been usual to form the groove for the entire width of the hub-rings, and the spline or feather along the full length of the axle-box. Such construction weakens the hub-rings to a very material extent, while at the same time the part of the box exposed between the rings is defaced by the presence of the continuous feather or spline thereon, and it will be seen that in my construction these defects are overcome by forming the shoulders and grooves of such a length as that the former are entirely concealed from view, with no appreciable loss of strength in the formation of the grooves, the construction of the two being such as that they co-operate irrespective of the side from which the box is introduced, and the rings are not weakened.

What I claim as new, and desire to secure by Letters Patent, is—

The combination of the rings A A', each provided with spoke-sockets and having a recess partly through the same, the box F, having a continuous flange and a short shoulder adjacent thereto, and a securing-nut, all substantially as shown and described.

In testimony whereof I have hereunto set my hand and seal in the presence of two subscribing witnesses.

J. A. JOHNSTON. [L. S.]

Witnesses:
 WM. C. MCINTIRE,
 DAVID H. MEAD.